United States Patent
Jeong et al.

(10) Patent No.: US 8,502,995 B2
(45) Date of Patent: Aug. 6, 2013

(54) PRINTING METHOD TO LOAD FILTER DYNAMICALLY AND RECORDABLE MEDIUM WITH PROGRAM TO EXECUTE THE PRINTING METHOD AND HOST APPARATUS

(75) Inventors: Tae-woon Jeong, Suwon-si (KR);
Yong-in Eom, Hwaseong-si (KR);
Young-soo Han, Yongin-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 939 days.

(21) Appl. No.: 12/397,385

(22) Filed: Mar. 4, 2009

(65) Prior Publication Data
US 2009/0237721 A1    Sep. 24, 2009

(30) Foreign Application Priority Data

Mar. 24, 2008    (KR) .......................... 10-2008-0027105

(51) Int. Cl.
*G06F 3/12*    (2006.01)
(52) U.S. Cl.
USPC ......... 358/1.13; 358/1.9; 358/1.15; 358/1.18; 715/239
(58) Field of Classification Search
USPC ............... 358/1.9, 1.13, 1.15, 1.18; 715/239
See application file for complete search history.

(56) References Cited

U.S. PATENT DOCUMENTS

| | | | |
|---|---|---|---|
| 7,639,378 B2 | 12/2009 | Kikuchi et al. | |
| 8,035,830 B2* | 10/2011 | Yoshida | 358/1.14 |
| 2005/0162678 A1* | 7/2005 | Nakata | 358/1.13 |
| 2006/0028667 A1 | 2/2006 | Saito | |
| 2006/0232811 A1 | 10/2006 | Yokoyama et al. | |
| 2006/0279644 A1* | 12/2006 | Toda | 348/231.6 |
| 2007/0165260 A1 | 7/2007 | Fransazov | |
| 2008/0278741 A1* | 11/2008 | Armstrong | 358/1.15 |

FOREIGN PATENT DOCUMENTS

| | | |
|---|---|---|
| JP | 2006228066 | 8/2006 |
| JP | 2006297632 | 11/2006 |
| JP | 2008052361 | 3/2008 |

OTHER PUBLICATIONS

European Search Report issued Aug. 27, 2010 in EP Application No. 09155021.0.
Korean Office Action Issue don Jul. 25, 2012 in KR Patent Application No. 10-2008-0027105.
European Office Action dated Feb. 26, 2013 issued in EP Application No. 09155021.0.

* cited by examiner

*Primary Examiner* — Peter K Huntsinger
(74) *Attorney, Agent, or Firm* — Stanzione & Kim, LLP (57) ABSTRACT

A printing method which dynamically loads a filter, a recordable medium with a program to execute the printing method, and a host apparatus. The printing method uses filter setting information having at least one filter corresponding to a print option of a print document, the printing method can include selecting a print option, changing the filter setting information corresponding to the print option, and applying the printing option according to the changed filter setting information and transmitting print data.

13 Claims, 11 Drawing Sheets

PRINTING METHOD TO LOAD FILTER DYNAMICALLY AND RECORDABLE MEDIUM WITH PROGRAM TO EXECUTE THE PRINTING METHOD AND HOST APPARATUS

CROSS-REFERENCE TO RELATED APPLICATIONS

This application claims priority from Korean Patent Application No. 10-2008-0027105, filed on Mar. 24, 2008 in the Korean Intellectual Property Office, the disclosure of which is incorporated herein by reference in its entirety.

BACKGROUND OF THE INVENTION

1. Field of the Invention

Apparatuses and methods consistent with the present general inventive concept relate to a printing method, recordable medium and host apparatus, and more particularly, to a printing method to load a filter dynamically, a recordable medium with a program to execute the printing method and a host apparatus.

2. Description of the Related Art

Recently, Microsoft has unveiled concepts on a new XPS (XML Paper Specification) file format to replace existing EMF files, and an XPS-based print driver to print in the XPS file format.

Figure 1:
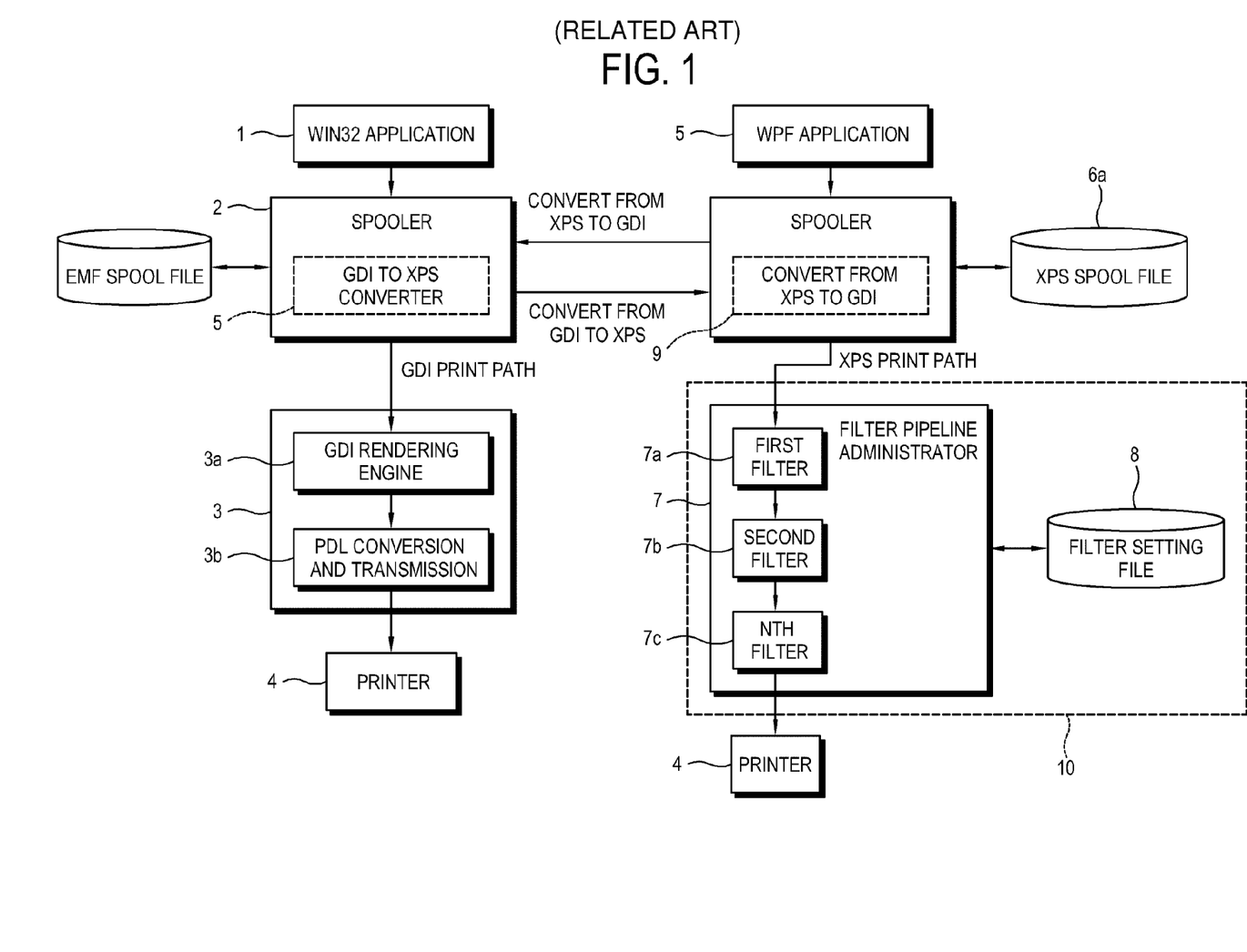
FIG. 1 is a block diagram to illustrate a GDI print path and an XPS print path.

FIG. 1 illustrates an XPS print path as a part of a newly-employed print architecture together with a GDI print path from Windows Vista OS excerpted from the MS press release.

From the GDI print path, if a print command is sent through a Win32 application 1 for original data, a spooler 2 spools the original data into an enhanced meta file (EMF). The EMF file is rendered into a GDI (Graphic Device Interface) function supplied by Windows OS by a GDI rendering engine 3a of a GDI-based printer driver 3. The rendered EMF file is rendered into a PDL (Page Description Language) by a PDL conversion transmitter 3b to be recognized by the printer 4 and then transmitted to the printer 4. Therefore, the printer 4 finally prints the file. Here, PDL includes PCL (Printer Command Language) developed by HP and PS (PostScript) developed by Adobe.

From the XPS print path, if a print command is sent through .Net Framework 3.0 based WPF (Windows Presentation Foundation) application 5 for original data, a spooler 6 spools the original data into an XPS file format. A filter pipeline administrator 7 reads a filter setting file 8 and loads a first filter 7a, a second filter 7b and an nth filter 7c in sequence written in the filter setting file 8 to process the XPS spool file 6a. The XPS spool file 6a processed by the nth filter 7c is transmitted to the printer 4 to be printed.

Here, OS provides a GDI to XPS converter to convert the original data into the XPS spool file to thereby print the original data written from the Win32 application along the OXS print path. Conversely, an XPS to GDI converter is also provided to convert the original data into GDI to thereby print the original data written from the WPF application along the GDI print path.

Figure 2:
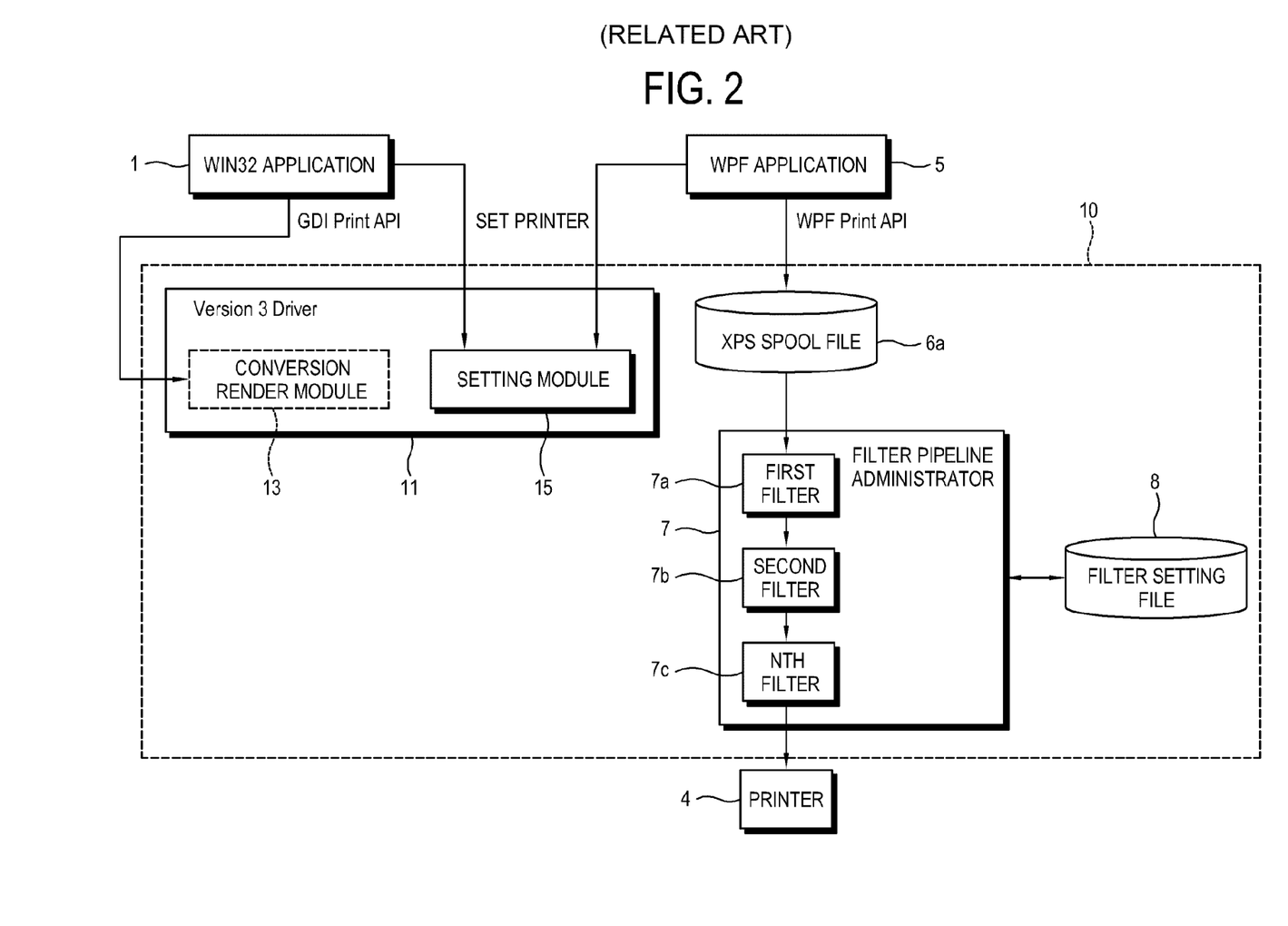
FIG. 2 is a block diagram to illustrate functions of a conventional XPS printer driver 10.

To embody the foregoing XPS print path, an XPS printer driver 10 is required, and the detailed configuration thereof is as shown in FIG. 2.

The XPS printer driver 10 includes a Version 3 driver 11 and a filter pipeline administrator 7. The Version 3 driver 11 includes a conversion render module 13 to convert the original data written from the Win32 application 1 using a GDI print API (Application Programming Interface), into an XPS spool file; and a setting module 15 to receive printer setting information.

The filter pipeline administrator 7 reads a filter setting file 8 and loads the first filter 7a, and second filter 7b to nth filter 7c in sequence corresponding to a filter description written in the filter setting file 8. The respective filters 7a, 7b and 7c process the XPS spool file according to a principle set during programming. The processed XPS spool file is transmitted to the printer to be printed.

Figure 3:
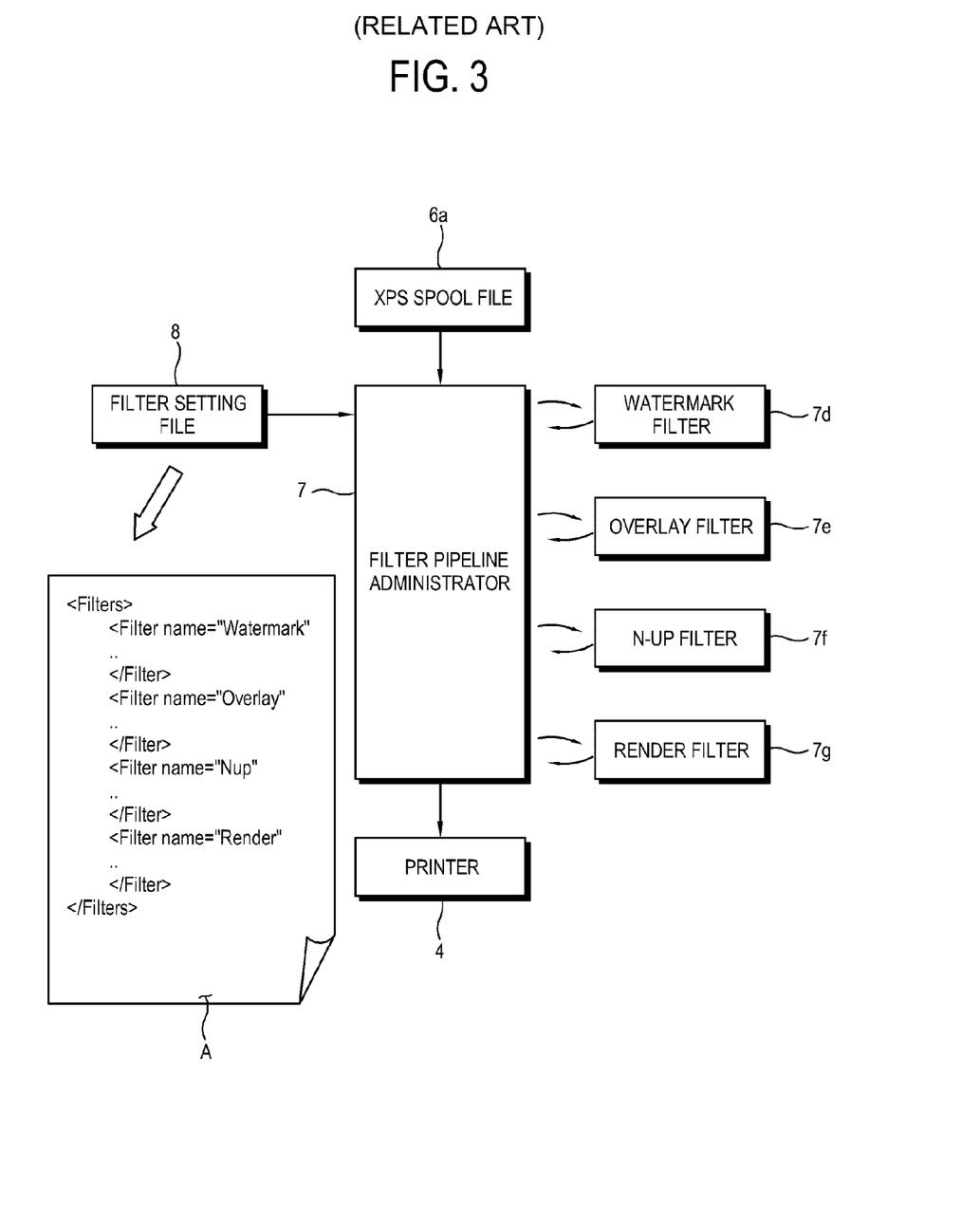
FIG. 3 is a block diagram to describe functions of a filter pipeline administrator of the XPS printer driver 10 in FIG. 2.

FIG. 3 illustrates operations of filters by the filter pipeline administrator 7.

As shown therein, four filter descriptions A of "watermark", "overlay", "N-up" and "render" are written in sequence in the filter setting file 8.

The filter pipeline administrator 7 reads the filter setting file 8, and loads "watermark," "overlay," "N-up" and "render" filters corresponding to the filter description A, in sequence, to process an XPS spool file 6a. More specifically, the filter pipeline administrator 7 loads the watermark filter 7d first. The watermark filter 7d outputs an XPS spool file watermarked from the XPS spool file 6a. The watermarked XPS spool file is inputted to the next overlay filter 7e. The XPS spool file inputted by the overlay filter 7e is used to output an overlaid XPS spool file. Likewise, as the XPS spool file 6a passes through the filter pipeline including a series of filters 7d, 7e, 7f and 7g, each of the filters 7d, 7e, 7f and 7g processes the XPS spool file 6a. Here, the render filter 7g converts the inputted XPS file into a PDL required by the printer 4. Then, the converted PDL data are transmitted to the printer 4 to be printed.

However, the conventional filter setting file has the fixed filter description A, and filters are loaded to process print options even though a user did not select the print option.

If the render filter is fixed in the filter setting file, the XPS spool file passes through the render filter to increase the printing job time even though the printer supports the XPS spool file format and the PDL conversion is not necessary.

If a printer does not support the XPS spool file format, the render filter should be present. However, if the filter setting file is fixed to have no render filter, the printer may not print the file. Particularly, considering office environment where a plurality of host apparatuses and printers are connected in a network, some printers may not be used as the filter description of the render filter is fixed in the filter setting file.

SUMMARY OF THE INVENTION

The present general inventive concept provides a printing method to dynamically change filters according to a print option, a recordable medium with a program to execute the printing method and a host apparatus.

The present general inventive concept also provides a printing method which reduces print time, a recordable medium with a program to execute the printing method and a host apparatus.

The present general inventive concept also provides a printing method that performs a print operation even if a data format recognizable by an image forming apparatus changes, a recordable medium with a program to execute the printing method and a host apparatus.

Additional aspects and utilities of the present general inventive concept will be set forth in part in the description which follows and, in part, will be obvious from the description, or may be learned by practice of the general inventive concept.

Embodiments of the present general inventive concept can be achieved by providing a printing method which uses filter setting information having at least one filter corresponding to a print option of a print document and an XPS printer driver, the printing method including: selecting the print option; changing the filter setting information corresponding to the print option; and applying the printing option according to the changed filter setting information and transmitting print data.

The printing method may further include restoring the filter setting information after the print operation.

The changing the filter setting information may include initializing the filter setting information, and changing the filter setting information according to at least one filter corresponding to the selected print option.

The printing method may further include displaying changed content of the filter setting information.

The printing method may further include determining whether an image forming apparatus to which the print data is to be transmitted is able to print the print data.

The printing method may further include changing the print data to be printed by the image forming apparatus if the image forming apparatus is unable to print.

The changed print data may include a PDL (Page Description Language).

The printing method may further include displaying print unavailability if an image forming apparatus to which the print data is to be transmitted is not able to print the print data.

Embodiments of the present general inventive concept can also be achieved by providing a recordable medium with a computer program to execute a printing method, the printing method which uses filter setting information having at least one filter corresponding to a print option of a print document and an XPS print driver, and includes: selecting the print option; changing the filter setting information corresponding to the print option; and applying the printing option according to the changed filter setting information and transmitting print data.

Embodiments of the present general inventive concept can also be achieved by providing a host apparatus which has an interface to be connected with an image forming apparatus, the host apparatus including an input unit to receive a print option; a storage unit which stores therein an application program to write a print document and filter setting information; and a controller which changes the filter setting information to have at least one filter corresponding to the inputted print option, generates print data about the print document according to the changed filter setting information and transmits the generated print data to the image forming apparatus through the interface if a print command is sent for the print document.

The controller can restore the filter setting information after the print data are transmitted to the image forming apparatus.

The controller initializes the filter setting information when changing the filter setting information, and changes the filter setting information according to at least one filter corresponding to the selected print option.

The host apparatus further includes a display unit, wherein the controller controls the display unit to display changed content of the filter setting information.

The controller determines whether the image forming apparatus prints the print data.

The controller can change the print data to be printed by the image forming apparatus if the print data are not printable by the image forming apparatus.

The changed print data include a PDL (Page Description Language).

The host apparatus may further include a display unit, wherein the controller displays print unavailability on the display unit if the print data are not printable by the image forming apparatus.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

A printing method, a recordable medium with a program to execute the printing method and a host apparatus according to exemplary embodiments will be described in detail with reference to accompanying drawings.

Figure 4:
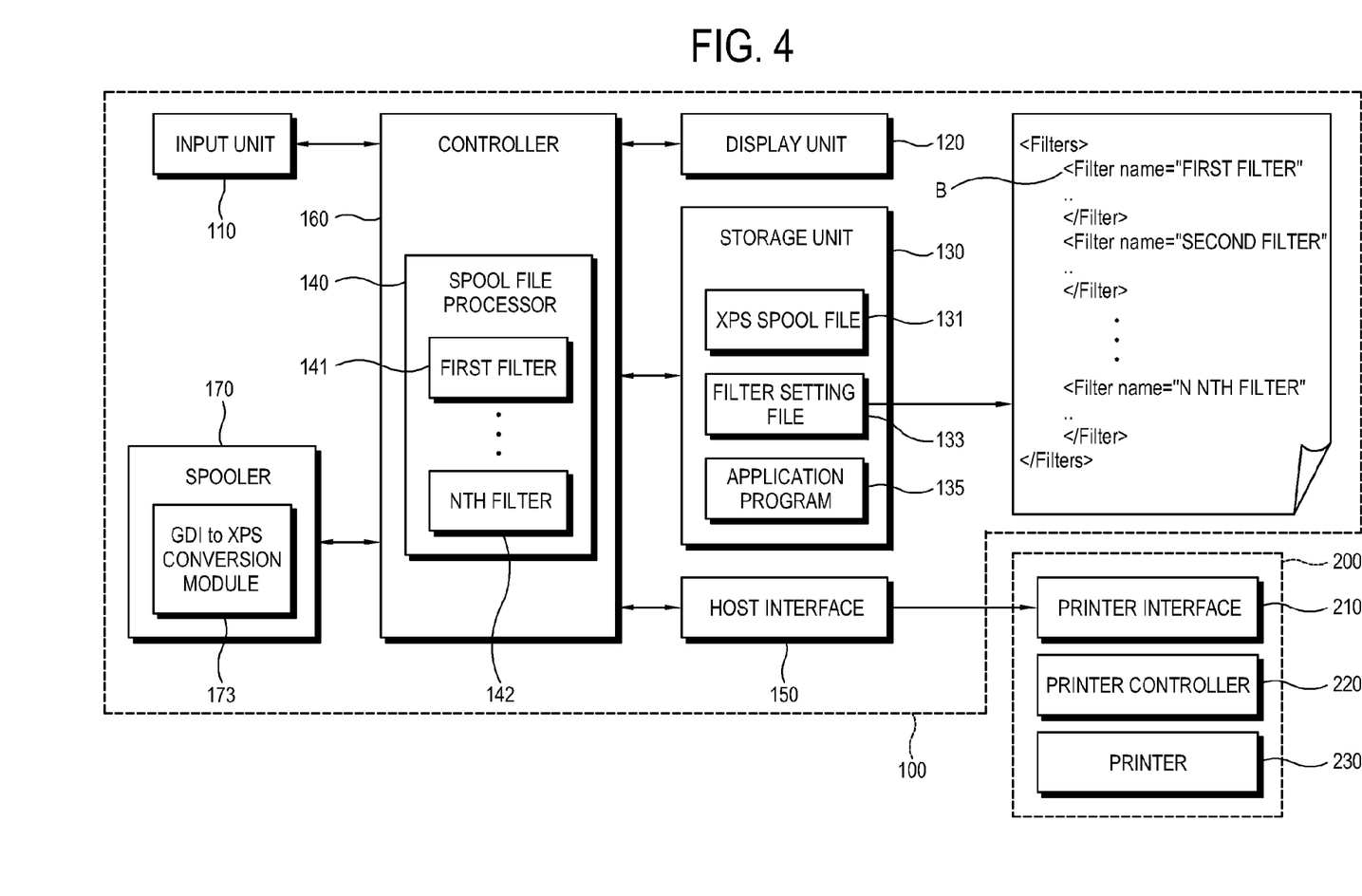
FIG. 4 is a block diagram of a host apparatus 100 according to an exemplary embodiment of the present general inventive concept.

FIG. 4 is a block diagram of a host apparatus 100 according to an exemplary embodiment of the present general inventive concept and an image forming apparatus connected to the host apparatus 100.

The host apparatus 100 according to the present embodiment includes an input unit 110, a display unit 120, a storage unit 130, a host interface 150 and a controller 160.

The input unit 110 includes an input means such as, for example, a mouse and a keyboard to receive a user input.

The display unit 120 includes a display device such as, for example, a CRT monitor and an LCD monitor. The display unit 120 displays a UI (user interface) thereon to select a print option.

The storage unit 130 includes a storage medium such as, for example, a hard disk, flash memory and RAM to read and write. The storage unit 130 stores therein an XPS spool file 131 and a filter setting file 133.

The storage unit 130 may store therein an application program 135 such as WPF (Windows Presentation Foundation) application or WIN application to write a print document.

The storage unit 130 stores therein an Operating System (OS, not shown) to support an operation of the application program 135. The WPF application operates in Windows Vista OS of Microsoft, and may operate if .Net Framework 3.0 is installed in Windows XP or Windows 2003 OS. The Windows Vista, and Windows XP and Windows 2003 having the .Net Framework 3.0 support the XPS print path as a new print architecture.

The XPS spool file 131 may be stored in the storage unit 130 in two cases. First, if a print command is sent through the WPF application, the WPF application generates data of print documents in an XPS document format. Then, the XPS spool file 131 is stored in the storage unit 130. The XPS document format is defined in XPS (XML Paper Specification), and the XPS document format conforms to the XPS spool file format.

Second, if a print command is sent through the Win32 application for a print document, a spooler 170 converts data of GDI-based print document written in the Win32 application into the XPS spool file 131 by using a GDI to XPS conversion module 173 of the OS.

That is, the XPS spool file 131 may be generated by the conversion module 173 not only when the print command is sent through the WPF application, but also through the WIN32 application.

The generated XPS spool file 131 includes original data written from the application program; a print option for the original data; and setting information of an image forming apparatus 200 connected to the host apparatus 100. Here, the print option which is included in the XPS spool file 131 also includes a print option selectively inputted by a user through the input unit 110.

The filter setting file 133 includes filter information about at least one of first filter 141 to nth filter 142 to be loaded by a spool file processor 140 of the controller 160 (to be described later). Here, the filter information includes a filter description B such as a name of a filter to be loaded. The filter setting file 133 may be called filter setting information.

The controller 160 changes the filter setting file 133 to have at least one filter corresponding to the print option inputted through the input unit 110 if a print command is sent through the application program for the print document.

More specifically, the controller 160 changes the filter description B of the filter setting file 133 according to the print option inputted by the input unit 110. Then, the filter description B of the filter setting file 133 is changed dynamically corresponding to the print option selected by a user, and the data do not need to pass through unnecessary filters. Thus, more efficient print is available and print time can be reduced.

In some cases, the controller 160 may control the display unit 120 to display a detail of the changed filter setting file 133.

If necessary, the controller 160 may initialize the filter setting file 133 not to have the filter description B when changing the filter setting file 133. Then, the controller 160 may determine the selected print option and add filter information corresponding to the determined print option to the initialized filter setting file 133 to thereby change the filter setting file 133.

The controller 160 generates print data of the print document according to the changed filter setting information, and transmits the generated print data to the connected image forming apparatus 200 through a host interface 150.

More specifically, the controller 160 loads at least one of the filters 141 and 142 according to the changed filter setting file 133, and controls the XPS spool file 131 of the print document to pass through the loaded filters 141 and 142 to thereby generate print data. The controller 160 transmits the generated print data to a printer interface 210 of the image forming apparatus 200 through the host interface 150.

The print data are the XPS spool file 131 which has passed through the filters 141 and 142 to be processed, and may include spool data and data having print option information inputted through the input unit 110.

If the image forming apparatus 200 does not support the XPS spool file 131, the print data may be converted into a PDL (Page Description Language), another format supported by the image forming apparatus 200, through a render filter 145 in FIG. 7 (to be described later).

The controller 160 may store the original filter setting file 133 in the storage unit 130 before the filter description B is changed. After the XPS spool file is completely printed, the controller 160 may restore the stored filter setting file. More specifically, the controller 160 removes the filter setting file 133 having the changed filter description B and restores the original filter setting file (not shown). Here, the original filter setting file (not shown) may be additionally stored in another storage space of the storage unit 130, and then the changed filter setting file 133 may be removed before the additionally-stored original filter setting file is moved to the original position. Otherwise, a name of the original filter setting file (not shown) may be changed temporarily, and then it can be changed into the original name after the completion of a print operation. Further, other known methods may be employed to avoid Microsoft's Windows Hardware Quality Labs (WHQL) certification.

If a printer driver has a WHQL certification, it should receive certification again when information such as file size and date are changed, causing an inconvenience in using the printer driver. Thus, the filter setting file 133 which has changed to efficiently execute the XPS spool file may be removed after the completion of the print operation, and the original filter setting file may be restored to thereby avoid issues related to the WHQL certification.

The original filter setting file 133 is restored after the completion of the print operation, but it may be restored if the filter setting file 133 is not needed any more even though not physically "after the completion of the print operation." For example, if print data of the print document are transmitted to the image forming apparatus 200, if the filter processes the XPS spool file or if the XPS spool file passes through the filter pipeline, the filter setting file 133 is not required anymore.

Meanwhile, the controller 160 includes a spool file processor 140 to process data of the print document according to the print option.

More specifically, the controller 160 includes the spool file processor 140 to process the XPS spool file of the print document according to the print option.

The spool file processor 140 forms a filter pipeline which includes the filters 141 and 142 loaded corresponding to the filter description B written in the filter setting file 133. More specifically, the filter description B of the filter setting file 133 is changed by the controller 160 before the filters 141 and 142 are loaded by the spool file processor 140, and the filters 141 and 142 corresponding to the changed filter description B are loaded. The filters 141 and 142 are loaded in sequence as written in the filter description B, and process the XPS spool file 131 according to assigned functions.

The filters 141 and 142 may include at least one of a watermark filter to process a watermark print option, an overlay filter to process an overlay print option, an N-up filter to process an N-up print option, a poster filter to process a poster print option and a render filter to convert an XPS file format into a PCL (Printer Control Language) to be recognized by the image forming apparatus 200 and a PDL (Paper Description Language) such as PS (PostScript).

The overlay print option is used to overlay contents of two original documents in one page while the poster print option is used to enlarge the original data in 2×2 or 4×4 to print the data. The N-up print option is used to print a plurality of pages of the original data in one page.

The spool file processor 140 may include a filter pipeline administrator 7 (refer to FIG. 1) of Microsoft. Any element can be a spool file processor 140 as long as it loads a filter for independent processing and enables each filter to process a spool file.

The XPS spool file 131 which is processed by the nth filter 142 is transmitted to the image forming apparatus 200 through the host interface 150. The host interface 150 may include one of a parallel port and a USB port. The host interface 150 may have a network interface card to be connected to the Internet.

The image forming apparatus 200 receives the processed XPS spool file 131 through the printer interface 210. The printer controller 220 controls a printing unit 230 to print the received XPS spool file 131.

Figure 5:
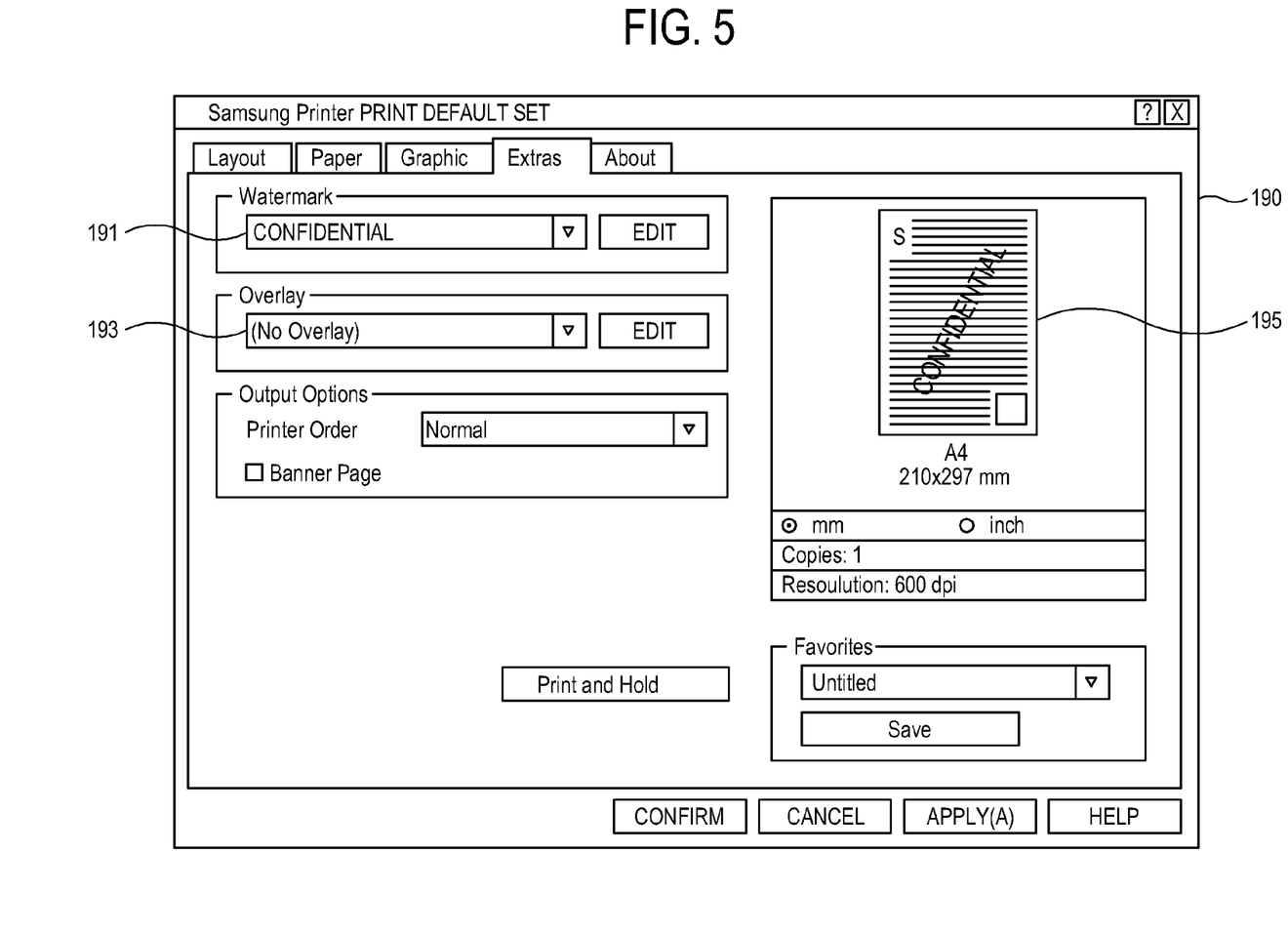
FIG. 5 illustrates an example of a printer driver UI displayed on a display unit of the host apparatus 100 in FIG. 4.

FIG. 5 illustrates an example of a printer driver UI 190 displayed on the display unit 120 of the host apparatus 100 in FIG. 4 to set a print option by a user.

It is assumed that a user selects to insert the term "CONFIDENTIAL" for the watermark print option 191 and not for the overlay print option 193. The printer driver UI 190 may provide a preview screen 195.

Figure 6:
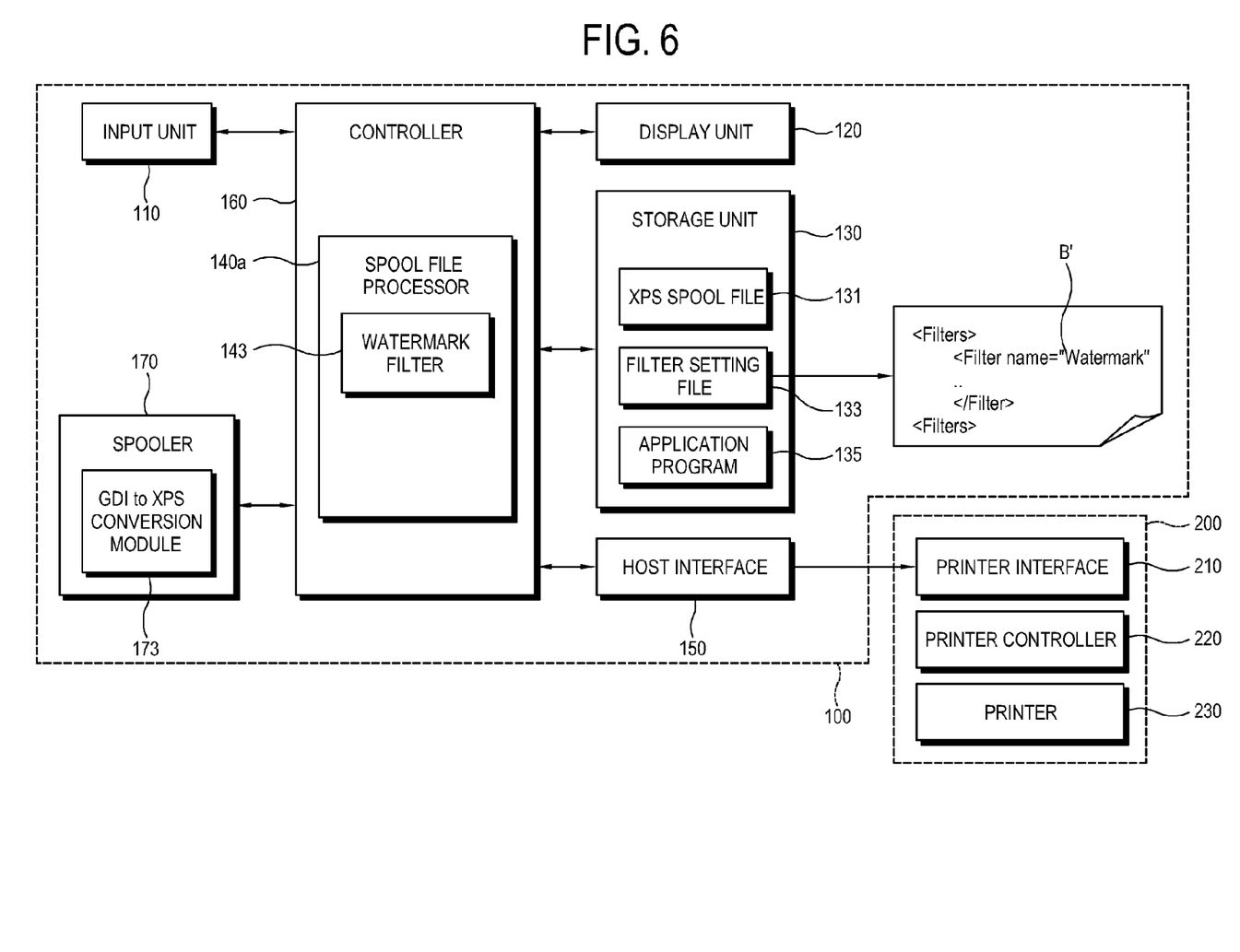
FIG. 6 illustrates content change of the filter setting file in FIG. 4 according to a print option selected from the UI in FIG. 5.

FIG. 6 illustrates a filter description B' of the filter setting file 133 dynamically changed by the controller 160 if a user selects the watermark print option 191 as in FIG. 5.

Once the watermark print option is selected, the filter description about filters processing other print options is removed from the filter description B' and the filter description about the watermark filter only exists.

The spool file processor 140a loads the watermark filter 143 according to the changed filter setting file 133. The watermark filter 143 watermarks the XPS spool file 131.

Therefore, the file does not pass through the unnecessary filters, and more efficient environment with shorter print time may be available.

Figure 7:
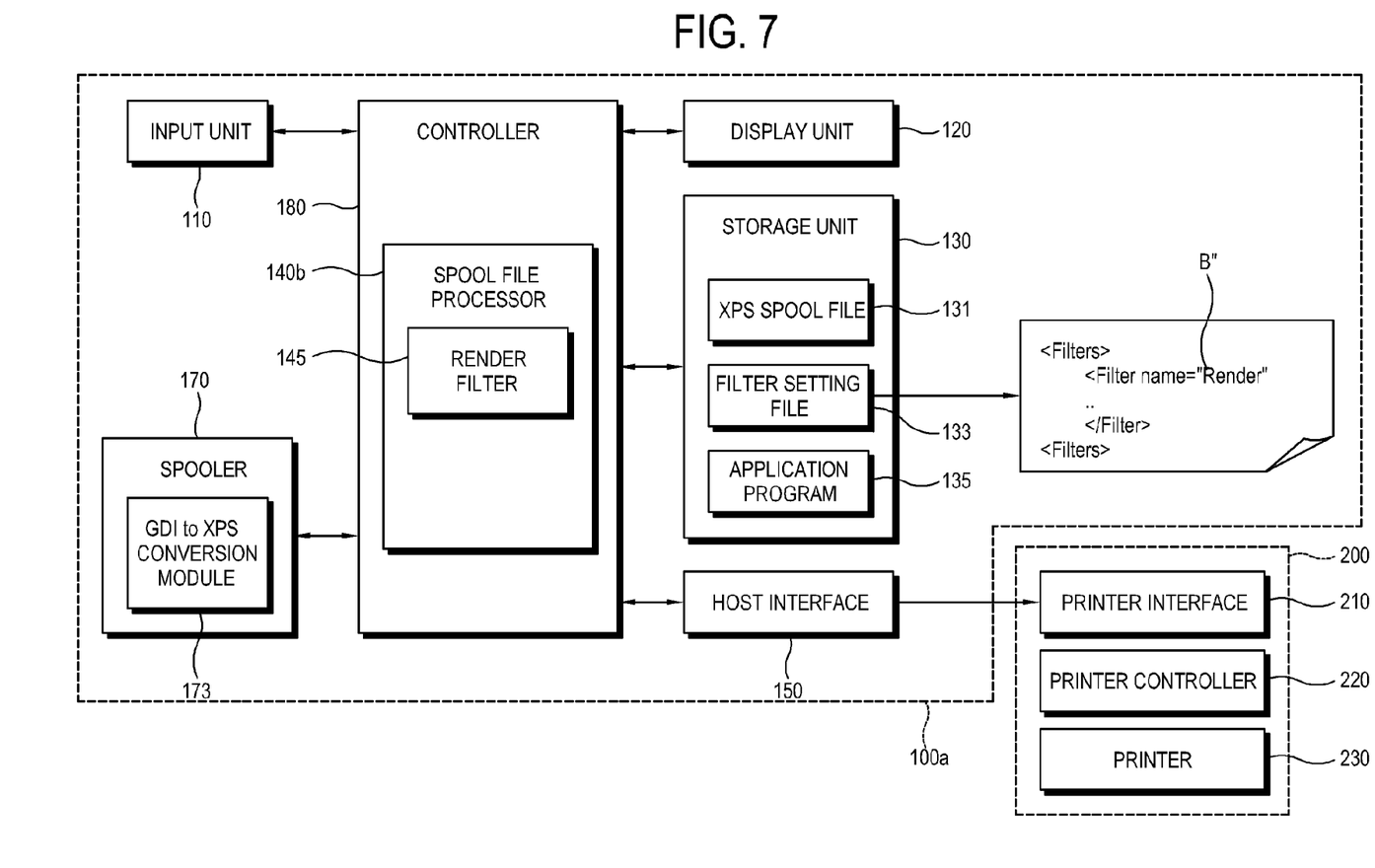
FIG. 7 is a block diagram of a host apparatus 100a according to another exemplary embodiment of the present general inventive concept.

FIG. 7 is a block diagram of a host apparatus 100a according to another exemplary embodiment of the present general inventive concept and an image forming apparatus 200 connected to the host apparatus 100a.

Elements which are different from those according to the previous exemplary embodiments will be described only.

A controller 180 may change a filter description B" of a filter setting file 133 according to a print option selected through an input unit 110.

The controller 180 may determine whether the image forming apparatus 200 connected through a host interface 150 and a printer interface 210 supports an XPS spool file.

To briefly describe the determination process, the controller 180 requests the image forming apparatus 200 about a supported file format, the image forming apparatus 200 reads information stored in a ROM (not shown) and transmits the information to the host apparatus 100a. Then, the controller 180 may determine the supported file format with the response information transmitted by the image forming apparatus 200 with respect to the request.

Whether the image forming apparatus 200 supports the XPS spool file may be determined not only when a print command is sent, but also whenever as required. For example, if a user executes a printer driver program, or if a predetermined time elapses, the controller 180 may determine periodically whether the image forming apparatus 200 supports the XPS spool file.

If it is determined that the image forming apparatus 200 does not support the XPS spool file, i.e., if the print data in an XPS spool file format may not be printed by the image forming apparatus 200, the controller 180 can control the display unit 120 to display the result.

If it is determined that the image forming apparatus 200 supports the XPS spool file, the controller 180 changes a filter description about the render filter 145 of the filter setting file 133.

More specifically, if the image forming apparatus 200 supports the XPS spool file, the controller 180 removes the filter description B" about the render filter 145 from the filter setting file 133. If the image forming apparatus 200 does not support the XPS spool file, the controller 180 adds the filter description B" about the render filter 145 to the filter setting file 133.

The spool file processor 140b loads the render filter 145 by the changed filter setting file 133. The loaded render filter 145 converts the XPS spool file 131 into a PDL supported by the image forming apparatus 200.

Thus, even if the image forming apparatus 200 is changed and the supported file format is changed accordingly, the filter setting file 133 may be dynamically changed corresponding thereto to provide a more efficient print environment.

Also, print unavailability due to wrong application of the render filter may be fully addressed.

As delay of print time due to the unnecessary application of the render filter is prevented, print time may be reduced.

The function of the controllers 160 and 180 may be realized by a printer driver, or by being added to the existing elements as necessary. The controllers 160 and 180 may be realized by an additional application program. The controllers 160 and 180 may be realized in hardware such as an additional chip instead of software.

Hereinafter, printing methods according to exemplary embodiments of the present general inventive concept will be described with reference to FIGS. 8 to 10B.

Figure 8:
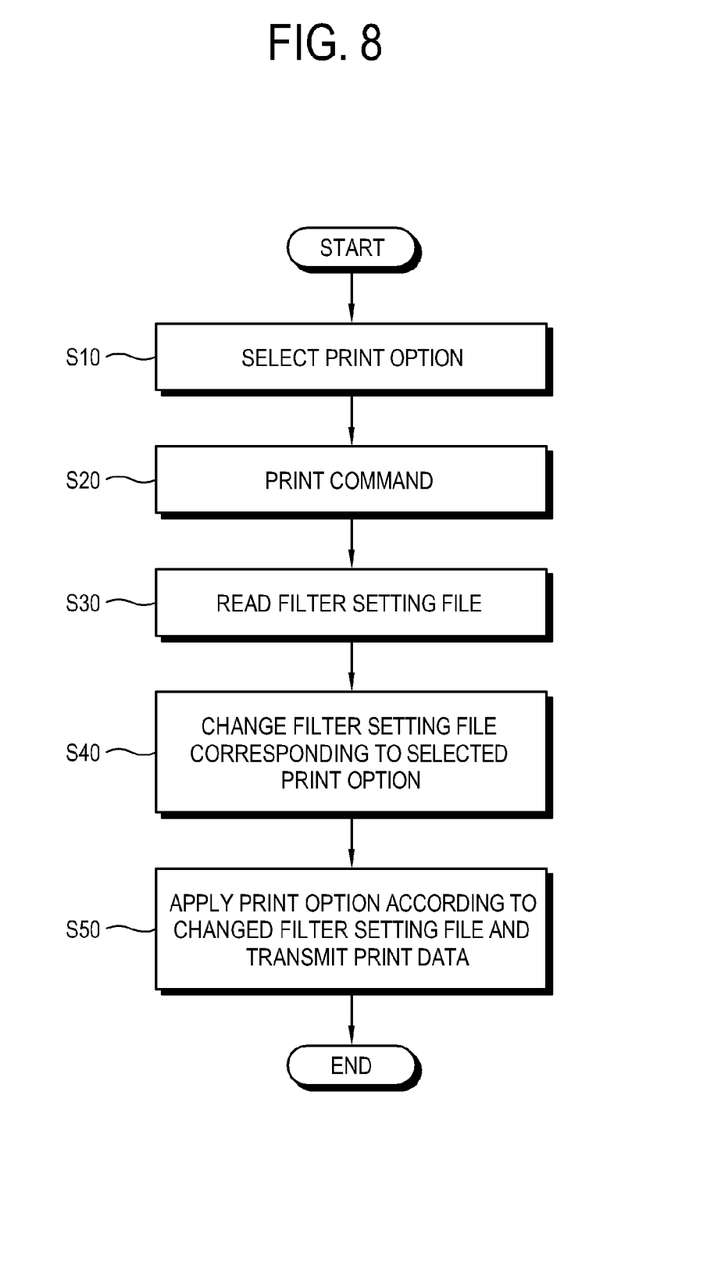
FIG. 8 is a flowchart of a printing method according to the exemplary embodiment of FIG. 4.

As shown in FIG. 8, printing method according to an exemplary embodiment selects a print option (operation S10). Then, a print command is sent through the WIN32 program or WPF application (operation S20).

After the print command, the filter setting file is read (operation S30) and the filter setting information is changed corresponding to the selected print option (operation S40). More specifically, the filter description included in the filter setting file is changed.

Then, the print option applies according to the changed filter setting information to transmit print data to the image forming apparatus (operation S50).

The filter description is dynamically changed according to the selected print option and the filters processing the unselected print option are not loaded. Thus, more efficient print environment may be provided and print time may be reduced.

Figure 9:
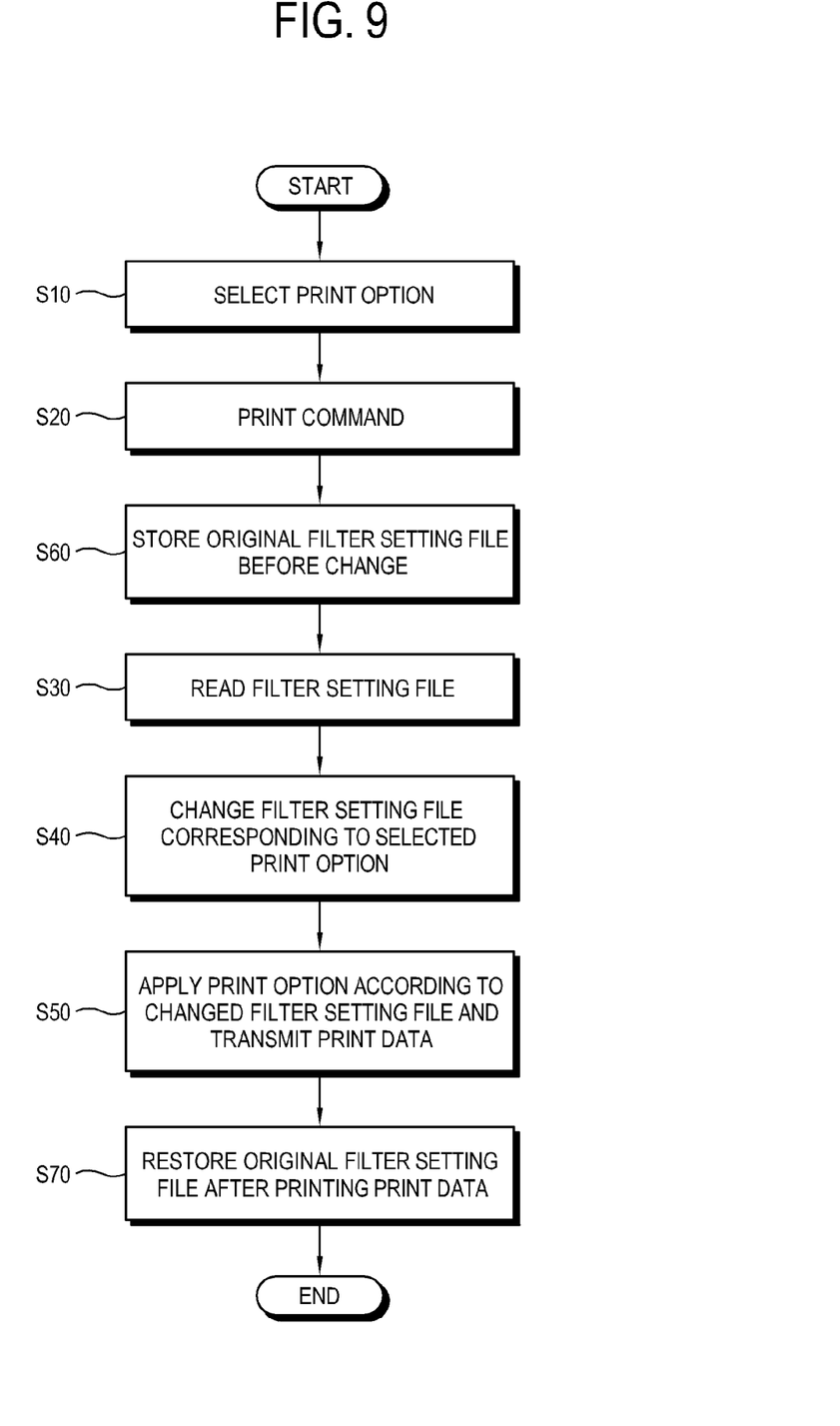
FIG. 9 is a flowchart of a printing method according to the exemplary embodiment of FIG. 7.

Referring to FIG. 9, a printing method according to another exemplary embodiment will be described. Repetitive description will be avoided.

The printing method according to the present exemplary embodiment further includes an operation of storing an original filter setting file before change (operation S60) and an operation of restoring the original filter setting file after the print data are printed (operation S70).

Thus, problems related to the WHQL certification may be avoided.

Figure 10A:
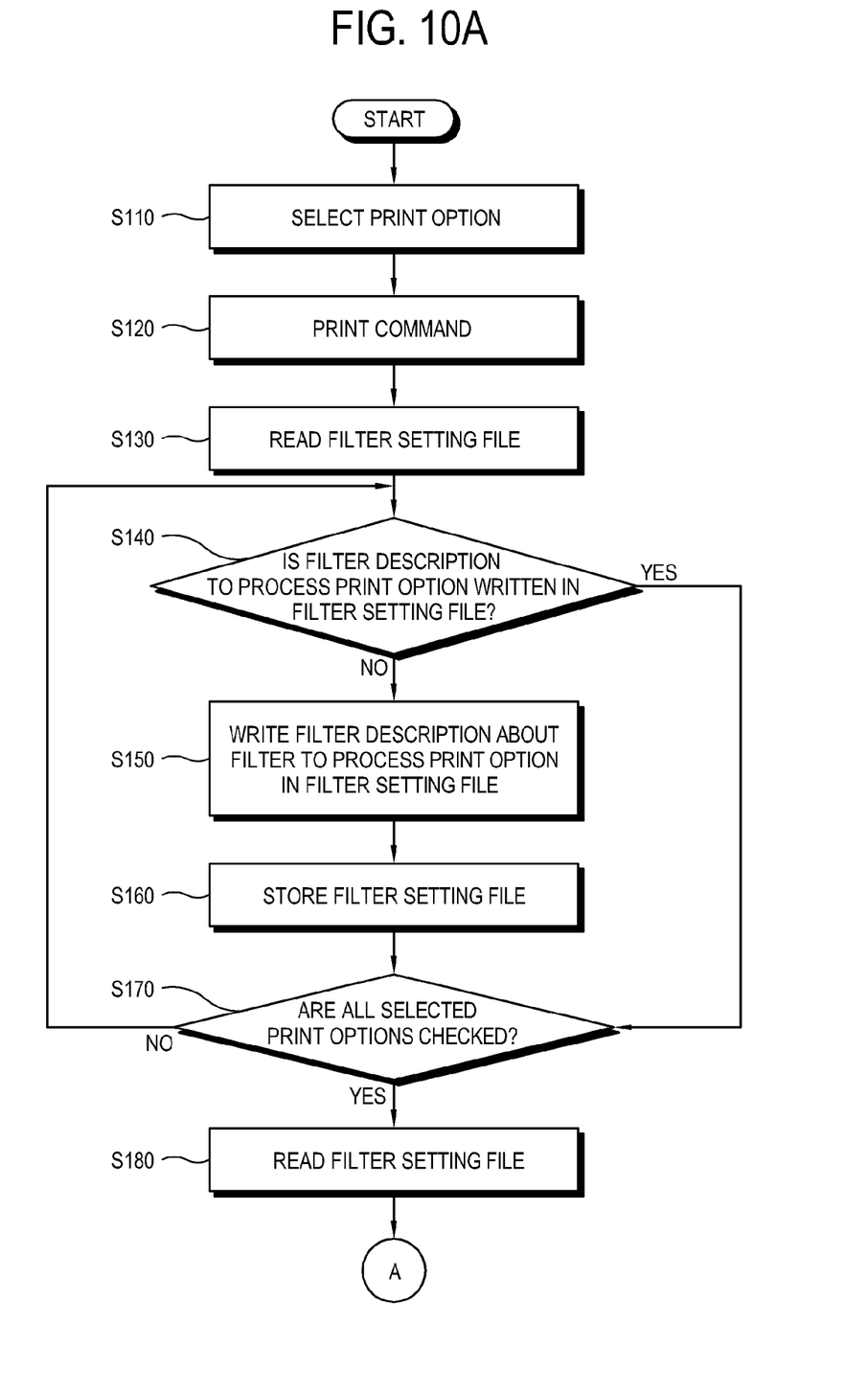
FIGS. 10A and 10B are flowcharts of a printing method according to another exemplary embodiment of the present general inventive concept.
Figure 10B:
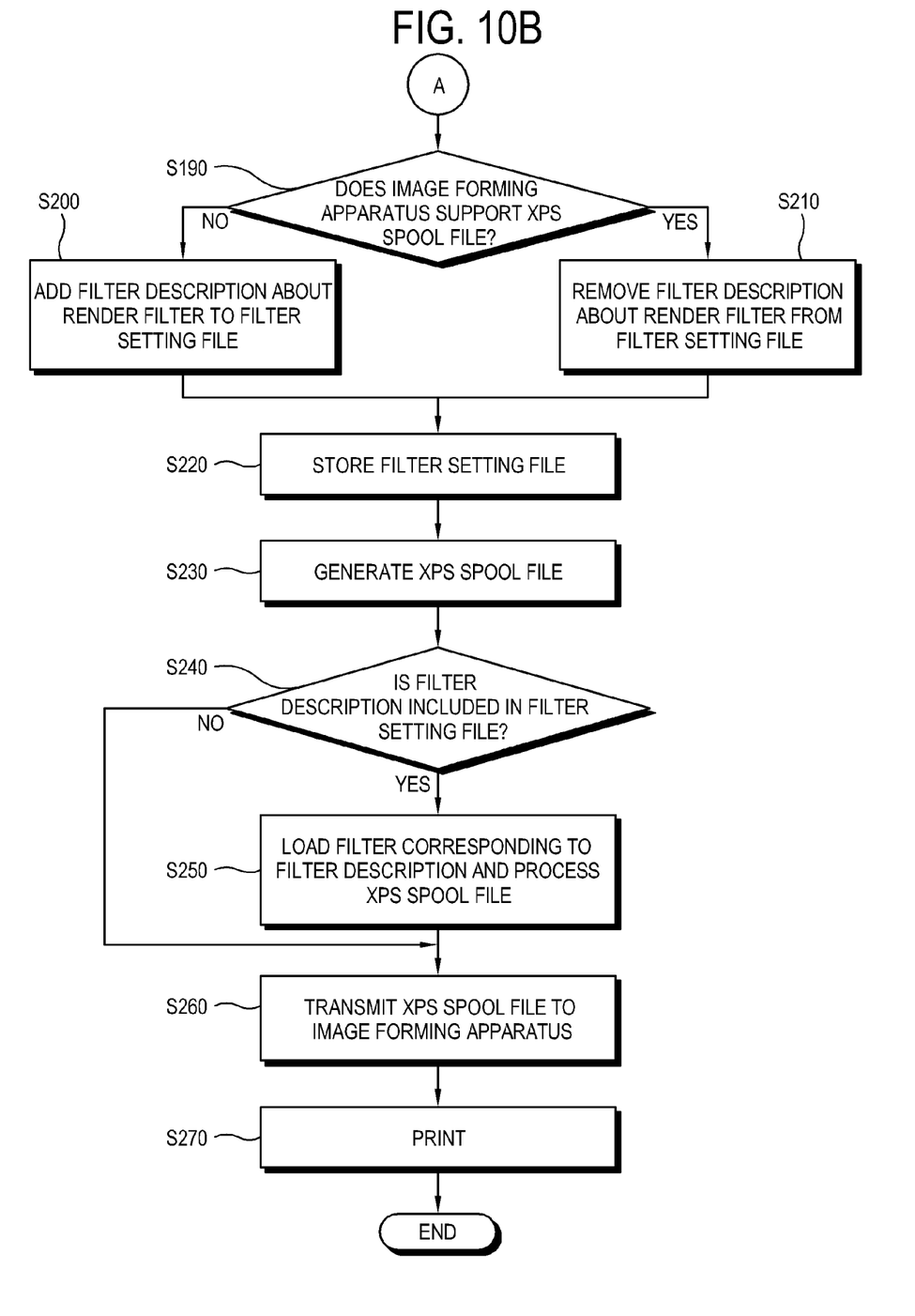

Referring to FIGS. 10A-10B, a printing method according to yet another exemplary embodiment will be described.

First, a print option is selected (operation S110). Then, a print command is sent through the WIN32 application or WPF application (operation S120).

The filter setting file is read (operation S130). It is determined whether the filter description to process the selected print option is written in the filter setting file (operation S140). An operation of initializing the filter setting file to remove all contents of the filter setting file may be inserted between the operations S120 and S130.

If it is determined that the filter description is not written, a filter description about a filter to process the print option is written in the filter setting file (operation S150).

Then, the changed filter setting file is stored (operation S160).

If it is determined that the filter description is written (operation S140), it is further determined whether all the print options selected by a user have been checked (operation S170). More specifically, it is determined whether the filter description corresponding to the selected print option is reflected in the filter setting file (operation S170).

If it is determined that the all the print options are checked, the filter setting file is read again (operation S180).

If it is determined that all the print options are not checked, operations S140 to S160 are repeated until all the print options are checked.

After the filter setting file is read again, it is determined whether the image forming apparatus supports the XPS spool file (operation S190).

If it is determined that the image forming apparatus supports the XPS spool file, the filter description about the render filter is removed from the filter setting file (operation S210). Here, the term "remove" means that the filter description is removed from the filter setting file if the filter description about the render filter is included in the filter setting file, and absence is maintained if the filter description is not included therein.

If it is determined that the image forming apparatus does not support the XPS spool file, a filter description about the render filter is added to the filter setting file S200. Here, the term "add" means that not only the filter description is additionally written in the filter setting file if the filter description about the render filter is not included in the filter setting file, but also the filter description about the render filter is maintained if it is included in the filter setting file.

After reflecting the render filter description to the filter setting file according to the XPS spool file support of the image forming apparatus, the reflected filter setting file is stored (operation S220).

Then, the XPS spool file is generated (operation S230). It is determined whether the filter setting file has the filter description (operation S240).

If it is determined that the filter description exists, at least one filter is loaded corresponding to the filter description to process the XPS spool file (operation S250).

If it is determined that the filter description does not exist, the XPS spool file is transmitted to the image forming apparatus while the operation of loading the filter and processing the XPS spool file is skipped (operation S260). Here, there may be no selected option and no filter description if the image forming apparatus supports the XPS spool file. As the XPS spool file may be directly transmitted to the image forming apparatus without being sent through the filters, the printing speed is much faster.

At operation S260, the data transmitted to the image forming apparatus is a spool file, which is print data including spool data and information about the selected print option. However, if the image forming apparatus may not print the print data having the print option, i.e., if the XPS spool file may not be printed, the print data are converted into the PDL format data by the render filter and then transmitted to the image forming apparatus to be printed.

The printing method according to the present embodiment may further include an operation of displaying print unavailability of the print data, as required.

Meanwhile, the print data which is transmitted to the image forming apparatus is printed on a print medium by a printing unit of the image forming apparatus (operation S270).

The foregoing printing method may provide more efficient printing environment such as reducing load to the host apparatus since the filters are changed dynamically depending on print options and XPS spool file supported by the image forming apparatus and the unnecessary filter is not loaded.

Also, the printing method may reduce print time.

As described above, the printing method, recordable medium and host apparatus provide the following effects.

First, as a filter is dynamically changed by a print option, a more efficient printing environment may be secured. Particularly, as an unnecessary filter is not loaded, load to the host apparatus may be reduced.

Second, print time may be reduced.

Third, data can be printed even if an image forming apparatus is changed and a data format recognizable by the image forming apparatus is changed accordingly.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing method which uses filter setting information having at least one filter corresponding to a print option of a print document and an Extensible Markup Language Paper Specification (XPS) printer driver, the printing method comprising:

selecting the print option;

changing the filter setting information corresponding to the selected print option;

applying the printing option according to the changed filter setting information and transmitting print data to be printed;

determining whether an image forming apparatus to which the print data is to be transmitted is able to print the print data; and changing the print data to be printed by the image forming apparatus if the image forming apparatus is unable to print, wherein, when the image forming apparatus is unable to print, at least one of the filter setting information is stored in a storage unit before a filter description is changed to enable printing and the stored filter setting information is restored after printing, and an original name of the filter setting information is changed temporarily and is changed into the original name after completion of printing corresponding to the selected print option.

2. The printing method according to claim 1, wherein the changing the filter setting information comprises:

initializing the filter setting information; and changing the filter setting information according to at least one filter corresponding to the selected print option.

3. The printing method according to claim 1, further comprising:
   displaying a changed content of the filter setting information.

4. The printing method according to claim 1, wherein the changed print data comprise a PDL (Page Description Language).

5. The printing method according to claim 1, further comprising:
   displaying print unavailability if an image forming apparatus to which the print data is to be transmitted is not able to print the print data.

6. A non-transitory computer recordable medium with a computer program to execute a printing method, the printing method which uses filter setting information having at least one filter corresponding to a print option of a print document and an Extensible Markup Language Paper Specification (XPS) print driver, and comprises:
   selecting the print option;
   changing the filter setting information corresponding to the selected print option;
   applying the printing option according to the changed filter setting information and transmitting print data;
   determining whether an image forming apparatus to which the print data is to be transmitted is able to print the print data; and
   changing the print data to be printed by the image forming apparatus if the image forming apparatus is unable to print,
   wherein, when the image forming apparatus is unable to print, at least one of the filter setting information is stored in a storage unit before a filter description is changed to enable printing and the stored filter setting information is restored after printing, and an original name of the filter setting information is changed temporarily and is changed into the original name after completion of printing corresponding to the selected print option.

7. A host apparatus which has an interface to be connected with an image forming apparatus, the host apparatus comprising:
   an input unit to receive a selected print option;
   a storage unit which stores therein an application program to write a print document and filter setting information; and
   a controller which changes the filter setting information to have at least one filter corresponding to the selected print option, generates print data about the print document according to the changed filter setting information, transmits the generated print data to the image forming apparatus through the interface if a print command is sent for the print document, determines whether the image forming apparatus prints the print data, and changes the print data to be printed by the image forming apparatus if the print data are not printable by the image forming apparatus,
   wherein, when the image forming apparatus is unable to print, at least one of the filter setting information is stored in a storage unit before a filter description is changed to enable printing and the stored filter setting information is restored after printing, and an original name of the filter setting information is changed temporarily and is changed into the original name after completion of printing corresponding to the selected print option.

8. The host apparatus according to claim 7, wherein the controller restores the filter setting information after the print data are transmitted to the image forming apparatus.

9. The host apparatus according to claim 7, wherein the controller initializes the filter setting information when changing the filter setting information, and changes the filter setting information according to the at least one filter corresponding to the selected print option.

10. The host apparatus according to claim 7, further comprising:
   a display unit, wherein
   the controller controls the display unit to display a changed content of the filter setting information.

11. The host apparatus according to claim 7, wherein the changed print data comprise a PDL (Page Description Language).

12. The host apparatus according to claim 7, further comprising:
   a display unit, wherein the controller displays print unavailability on the display unit if the print data are not printable by the image forming apparatus.

13. A host apparatus including an interface to connect with an image forming apparatus, the host apparatus comprising:
   a storage unit to store an application program to write a print document and filter setting information; and
   a controller which changes the filter setting information based on a requested print option, generates print data about the print document according to the changed filter setting information, transmits the generated print data to the image forming apparatus through the interface if a print command is sent for the print document, determines whether the image forming apparatus prints the print data, and changes the print data to be printed by the image forming apparatus if the print data are not printable by the image forming apparatus,
   wherein, when the image forming apparatus is unable to print, at least one of the filter setting information is stored in a storage unit before a filter description is changed to enable printing and the stored filter setting information is restored after printing, and an original name of the filter setting information is changed temporarily and is changed into the original name after completion of printing corresponding to the selected print option.

* * * * *